US005567494A

United States Patent [19]

Ageishi et al.

[11] Patent Number: 5,567,494

[45] Date of Patent: Oct. 22, 1996

[54] ROLLS FOR ELECTROSTATIC CHARGE

[75] Inventors: Kentaro Ageishi, Ebina; Ryuji Watanabe, Suzuka; Tsutomu Sugimoto, Ebina, all of Japan

[73] Assignee: Fuji Xerox Co., Ltd., Tokyo, Japan

[21] Appl. No.: 270,250

[22] Filed: Jul. 5, 1994

[30] Foreign Application Priority Data

Jul. 6, 1992 [JP] Japan .................................... 5-166917

[51] Int. Cl.$^6$ .............................. B25F 5/02; B32B 27/32; B32B 27/40

[52] U.S. Cl. ......................... 428/36.9; 219/216; 355/219; 428/36.91; 428/423.1; 428/424.2; 428/424.8; 428/425.8; 428/462; 428/516; 428/517; 428/519; 428/520; 428/521; 428/523; 492/56; 492/59

[58] Field of Search ........................ 492/56, 59; 219/216; 355/219; 428/425.8, 424.8, 424.2, 500, 519, 516, 461, 462, 423.1, 523, 517, 520, 36.9, 36.91, 521

[56] References Cited

U.S. PATENT DOCUMENTS 5,270,768 12/1993 Murata .................................. 355/219

FOREIGN PATENT DOCUMENTS

| | | |
|---|---|---|
| 64-20518 | 1/1989 | Japan . |
| 64-66674 | 3/1989 | Japan . |
| 1-211779 | 8/1989 | Japan . |
| 3-233473 | 10/1991 | Japan . |

OTHER PUBLICATIONS

"Densi Shashin Gakkai-shi" 27(4), 1988, pp. 59–63.

*Primary Examiner*—D. S. Nakarani
*Attorney, Agent, or Firm*—Oliff & Berridge

[57] ABSTRACT

An inexpensive roll for electrostatic charge having the simple layer structure not affected by working environmental conditions, not developing exuding phenomena such as bleeding and blooming, generating no leaks and being able to conduct a uniform, stable electrostatic charge, which comprises a core member, and a conductive elastomer layer and a surface layer laminated thereon in this order, the surface layer having a conductive material dispersed therein, wherein the surface layer has a higher electrical resistance in an outermost surface region thereof and formed of a thermosetting binder resin containing carbon black dispersed therein by electrostatic deposition.

4 Claims, 1 Drawing Sheet

ROLLS FOR ELECTROSTATIC CHARGE

FIELD OF THE INVENTION

The present invention relates to rolls for electrostatic charging which are bought into contact with surfaces of materials to be charged to charge the surfaces.

BACKGROUND OF THE INVENTION

As a means for charging materials to be charged such as photosensitive materials in image forming apparatuses of the electrophotographic recording system, the static recording systems, i.e., the contact charging system wherein rolls for electrostatic charging are rotated in contact with the surfaces of the photosensitive material to be charged has recently attracted attention, because this system has the advantages of smaller generation of ozone and lower applied voltage than the corona discharging system.

Such a roll fundamentally comprises a metallic core member and a conductive elastomer layer formed thereon.

However, in the case of the rolls for electrostatically charging this single-layer structure, adding conductive materials lowers the elasticity of elastomers such as EPDM (ethylene-propylene-diene) rubber, urethane rubber and silicone rubber. It is therefore necessary to lower the hardness of these rubbers. For this reason, softening agents, such as paraffin oil or plasticizers or sulphur-based crosslinking agents are added to the elastomer members, causing them to bleed or bloom, respectively, thereby staining the surfaces of the photosensitive materials to be charged and hindering the formation of images.

For the purpose of preventing the above-mentioned bleeding and blooming, for example, a roll for electrostatic charging in which a conductive surface layer composed of a conductive resin composition mainly comprising a methoxy-modified polyamide, etc. is formed on a surface of a conductive elastomer layer. This concept has been proposed in JP-A-64-66674 (the term "JP-A" as used herein means an "unexamined published Japanese patent application").

However, even when such a surface layer is provided, the conductive elastomer layer formed of EPDM rubber fails to have a sufficient sealing effect against oil-based liquid matter to prevent the exuding phenomenon under high temperature and high humidity. Further, the methoxy-modified polyamide is easily affected by humidity, and has the disadvantages of generating leaks due to pinholes in the photosensitive material under the circumstances of high humidity and of generating poor electrostatic charge under the circumstances of low humidity.

Rolls for electrostatic charging provided with conductive surface layers (volume resistivity: $10^4$ to $10^{12}$ Ω.cm) formed of methoxy modified nylon or urethane have also been proposed (JP-A-6A-20518, JP-A-3-233473, etc). However, their resistance is seriously affected, particularly by changes in atmospheric humidity, and they can increase three times or more in volume resistivity under low humidity, which makes providing a stable, uniform electrostatic charge impossible.

Furthermore, a roll for electrostatic charging having the multi-layer structure in which a conductive elastomer layer, is divided into an elastic layer and a conductive layer and a resistive layer (volume resistivity: $10^6$ to $10^{12}$ Ω.cm) is provided on the conductive layer has also been proposed (JP-A-1-211779). However, similar to the above-mentioned previous proposals, the presence of the resistive layer such as nylon results in preventing stable, uniform electrostatic charge because of a wide fluctuation in resistance due to humidity and fails to sufficiently prevent leaking through pinholes in photosensitive material under high applied voltage.

On the other hand, in manufacturing rolls for electrostatic charging having the multi-layer structure consisting of 3 or more layers, as well as the above-mentioned rolls of the two-layer structure, the respective layers on the elastic material are usually formed by spray coating or dip coating. Using these coating processes, however, makes it difficult to ensure that the coated films are produced with a uniform thickness. As a result, it is difficult to ensure uniform electrostatic charge and stable resistance, and the many coating steps complicate the manufacturing procedures to make it difficult to reduce costs. In the case of rolls for electrostatic charging of the multi-layer structure in which the respective layers have different functions, coating may be repeated several times in each coating step in order to secure a definite thickness of the respective layers, or bonding layers may be formed between the layers in some cases in order to provide adhesion between them. These also cause the troubles generated by the non-uniformity in thickness of the layers and high cost due to an increase in manufacturing steps.

SUMMARY OF THE INVENTION

An object of the present invention is to provide inexpensive rolls for electrostatic charging having the simple layer structure which are not affected by working environmental conditions, do not develop exuding phenomena such as bleeding and blooming, do not generate leaks and can conduct a uniform, stable electrostatic charge.

According to the present invention, there is provided a roll for electrostatic charging that includes a core member having laminated thereon, in sequence, a conductive elastomer layer and a surface layer having an electrical resistance of $10^{13}$ to $10^{16}$ Ω/cm$^2$ at the outermost surface region thereof.

Further, the present invention provides the roll for electrostatic charging described above, wherein the surface layer is a single layer comprising a binder resin and a conductive material, and the outermost surface region has a higher electrical resistance than the other region of the surface layer, or the surface layer is an electrostatically coated film formed by electrostatic deposition.

Furthermore, the present invention provides the roll for electrostatic charging described above, wherein the conductive elastomer layer is a layer comprising EPDM to which a softening agent, a plasticizer and a sulfur-based vulcanizing agent are not added, or urethane rubber.

Still further, the present invention provides a process for producing the roll for electrostatic charging described above.

DETAILED DESCRIPTION OF THE INVENTION

Figure 1:
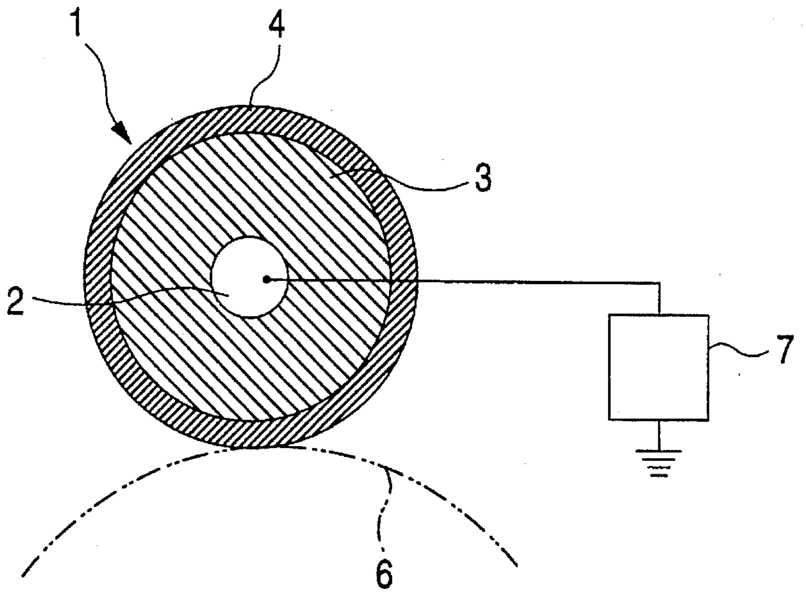
FIG. 1 is a cross sectional view showing a roll for electrostatic charging embodying the present invention.
Figure 2:
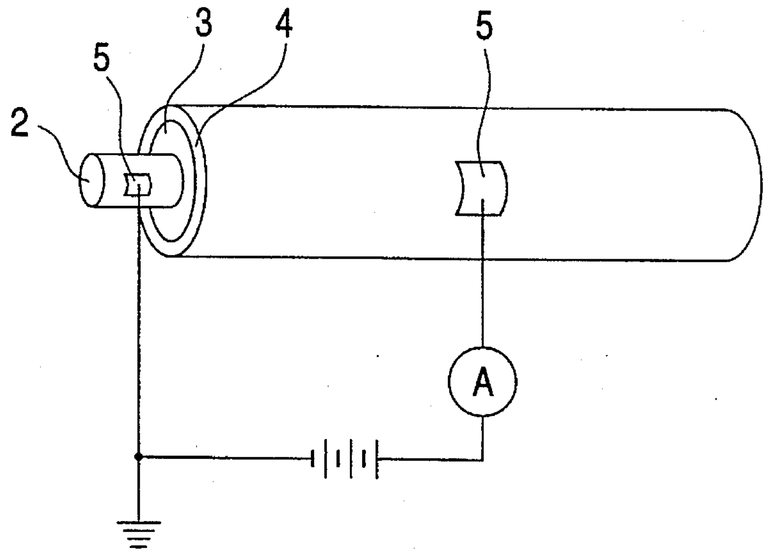
FIG. 2 is a schematic view for illustrating a method for measuring an electrical resistance at an outermost surface region of a surface layer.

In the present invention, the surface layer has the single layer structure formed of a resin composition having a conductive material dispersed into a thermosetting binder resin, and has an electrical resistance of $10^{13}$ to $10^{16}$ Ω/cm$^2$ at the outermost surface region. It is preferred that the outermost surface region has a higher electrical resistance than the other inner region of the surface layer, which has generally a uniform electrical resistance within the range of from $10^3$ to $10^9$ Ω.cm. The thickness of the surface layer is 100 μm or less, and preferably 10 to 60 μm. The outermost surface region of the surface layer is a region in the vicinity of the surface of the roll and has a thickness of 0.1 to 20 μm, preferably 0.5 to 10 μm, and more preferably 1 to 5 μm.

Examples of the above-mentioned thermosetting binder resins include acrylic resins such as polymethyl methacrylate and polybutyl acrylate blended with curing agents such as melamine resins, methylol melamine and epoxy resins; and urethane resins composed of polypropylene glycol, polytetrabutylene glycol, polyether polyols, polyester polyols, etc. blended with isocyanate curing agents such as MDI (diphenylmethane diisocyanate) and TDI (tolylene diisocyanate) or with curing agents such as melamine resins. In addition, epoxy resins, acid crosslinking polyamides, unsaturated polyester resins, alkyl resins, phenolic resins and cellulosic resins can be used. Of these, resin compositions containing acrylic resins, urethane resins or polyester resins as main components are preferred.

Examples of the conductive material dispersed in the thermosetting binder resin included metals such as zinc, aluminum, gold, silver, copper, chromium and iron, metal oxides such as zinc oxide, titanium oxide, stannic oxide, antimony oxide, indium oxide and aluminum oxide, mixtures or solid solutions of the metal oxides, and carbon black. Of these, carbon black is preferably used. Examples of the carbon black include hard carbon and soft carbon such as SAF, HAF, GPF, and SRF as furnace black; acetylene black; ketjen black; and channel black. The content of these conductive materials is preferably from 1 to 200 parts by weight per 100 parts by weight of binder resin. When the content is less than 1 part by weight, the electrical resistance fluctuates and the production stability is impaired. Conversely, if the content exceeds 200 parts by weight, poor kneading and high hardening result. The metal oxide as the conductive material is preferably used in an amount of 40 to 65 wt % of the surface layer. The metal of the carbon black as the conductive material is preferably used in an amount of 0.5 to 10 wt % of the surface layer.

The surface layer can be formed by applying a dispersion of a conductive material in the above-mentioned binder resin by electrostatic coating. In this case, the electrical resistance of the dispersion must be set to 0.01 MΩ or more, preferably 0.1 to 1 MΩ, prior to coating. When the electrical resistance of the dispersion is less than 0.01 MΩ, the coating dispersion is not charged and therefore, poor extrusion of the coating dispersion and non-uniformity of the resulting film occur.

The conductive elastomer layer of the present invention is prepared by adding carbon black or metal oxides to an elastic material to give it conductivity, and the volume resistivity is adjusted to $10^0$ to $10^{10}$ Ω.cm and the (rubber) hardness (ASKA A hardness) to 30° to 70°, preferably 45° to 65°. The volume resistivity of the conductive elastomer layer is preferably adjusted to almost the same value as that of the region other than the outermost surface region in the surface layer, which is in the range or $10^3$ to $10^9$ Ω.cm.

The thickness of the conductive elastomer layer of the present invention is 1 to 20 mm, preferably 3 to 10 mm.

Examples of the elastic materials include rubber such as polybutadiene, natural rubber, polyisoprene, butyl rubber, SBR (styrene-butadiene rubber), CR (chloroprene), NBR (nitrile-butadiene rubber), silicone rubber, and epichlorohydrin rubber; thermoplastic elastomers such as BR (butadiene rubber), polystyrene-based rubber such as SBS (styrene-butadiene-styrenelastomer), polyolefin-based rubber, polyester-based rubber, polyurethane-based rubber, PVC (polyvinyl chloride) and nitrile rubber; and polymer materials such as polyurethane, polystyrene, polyethylene, polypropylene, PVC, acrylic resins and styrene-vinyl acetate copolymers. Rubber having good resistance to ozone includes urethane rubber, EPDM, etc.

In particular, these elastic materials are desirably used without adding additives thereto, such as softening agents, plasticizers, sulfur-based vulcanizing agents, insulating oils (mineral oil, silicone oil, etc.), processing aids (phthalic acid-based plasticizers and calcium carbonate), silica-based fillers (hydrous silicic acid and anhydrous silicic acid) and vulcanization accelerators (sulfonamides, thiurams and dithiocarbamic acid). Preferred examples of the elastic materials include diene-based rubber such as butadiene rubber or polyisoprene, containing no additive (EPDM), or urethane rubber. When the above-mentioned additives need to be used, the amount thereof to be added must be maintained as low as possible and the low molecular weight component thereof is preferably removed before use with a rubber material.

Examples of the diene-based rubber such as butadiene rubber include those subjected to peroxide vulcanization by use of dicumyl peroxide and the like; those subjected to metallic oxide crosslinking by use of metallic salt monomer in combination of a monomer such as acrylic acid and methacrylic acid with a metallic oxide such as zinc oxide and magnesium oxide; those subjected to thiuram vulcanization forming disulfide crosslinking; and those subjected to quinoid vulcanization.

Carbon black used in the above-mentioned surface layers can also be used in this case. The content of carbon black is from 1 to 100 parts by weight per 100 parts by weight of elastic material. The content exceeding 100 parts by weight hardens rubber when it is used as the elastic material.

Blends of the above-mentioned elastic materials with carbon black are used as the conductive elastomer layers which are formed by conventional methods such as extrusion molding, press molding, casting and injection molding.

When both sides of the elastomer layer are made perpendicular to the core member, the sides are desirably formed to make curved planes. Such sides enable the surface layer to be formed in the vicinity of the core member. As a result, the generation of leaks at the sides of the roll can be prevented, because the side regions of the roll for electrostatic charging are also covered with the surface layer.

When electrostatic charge is conducted by use of this roll, a voltage of 100 to 5,000 V is preferably applied.

In the present invention, an electrostatic deposition (spraying) process is conducted as follows. A core member having molded thereon a conductive elastomer layer is grounded to the earth, and a spray coating apparatus having placed therein the above mentioned coating solution (dispersion) is connected to a cathode whereby a negative charge is imparted to the coating solution upon spraying. The sprayed coating solution is efficiently applied, due to the negative charge, to the core member having molded thereon the conductive elastomer layer, which acts as anode. In order to spray the coating solution, an electrostatic atomizer which finely particulates a coating solution by applying an electrostatic field, or an air atomizer (spray gun) which atomizes a coating solution by application of a high pressure with a compressed air may be used. The air atomizer is preferably used from the viewpoint of efficiency. The voltage applied to the coating solution is preferably from 70 to 100 KV, more preferably 80 to 95 KV. In case of using the air atomizer, the air is compressed at the pressure of 1.0 to 5.0 $Kg/cm^2$, preferably 1.5 to 3.5 $Kg/cm^2$, and the amount of the coating solution to be sprayed (discharge) is from 10 to 200 ml/min, preferably 30 to 100 ml/min. The gap between the coated material on the core member and the spray gun is from 100 to 800 mm, preferably 200 to 500 mm. An infrared drying hearth may be provided directly following the coating apparatus to conduct the coating and drying at the same time.

In such a roll for electrostatic charging of the present invention, the surface layer having the conductive material dispersed therein has an outermost surface layer region having a higher electrical resistance than the other region. The roll therefore has the single layer structure wherein the conductive layer and the high resistive layer coexist, so that uniform, satisfactory electrostatic charge can be conducted without the generation of leak due to a pinhole.

Further, such a surface layer with a constant thickness can be simply formed by electrostatic deposition. In addition, formation of the surface layers by electrostatic deposition absorbs and cancels non-uniformity in forming and joint lines in the inner conductive elastomer layer. As a result, it is possible to obtain an extremely smooth surface on the roll for electrostatic charge which prevents poor electrostatic charge due to the non-uniformity in forming and the joint lines, and moreover, prevents deterioration in images.

The surface layer formed by electrostatic deposition has an outermost surface region having a high electrical resistance and therefore, it is unnecessary to provide a leak-proof layer (a high resistive layer) which is otherwise required separately in a resistive layer formed by customary spray coating or dip coating. For example, the surface layer formed of a binder resin such as an acrylic resin generates no leak up to an AC applied voltage $V_{(p-p)}$ of about 1 to about 5 kV. The reason why the surface layer containing such a high resistive surface region is formed is probably that a comparatively large amount of the conductive material in the coating dispersion is coated together with the binder resin during the first half of electrostatic deposition operation to maldistribute the conductive material in the direction of film thickness (the conductive material exists at a higher concentration in a more inner region of the surface layer).

The surface layer formed of a thermosetting binder resin can be laminated with the conductive elastomer layer with high adhesion, so that no adhesive layer may be required, the surface layer being directly adhered to the conductive elastomer layer.

Further, this surface layer yields stable electrostatic charge characteristics that are not affected by working environmental temperature and moisture. In addition to providing the surface layer, the inner conductive elastomer layer is formed of a material that lacks any additive that causes bleeding and blooming, which can conduct satisfactory electrostatic charge without problems such as bleeding, even if it is not constructed of multiple layers, like the prior art.

Furthermore, as this roll for electrostatic charging has the simple two-layer structure and the surface layer thereof is readily formed by a single static deposition step, it can be manufactured in a short period of time at low cost.

The present invention will be illustrated with reference to Examples and Comparative Examples in more detail below. Hereinafter, "part" means "part by weight".

EXAMPLE 1

To 100 parts of raw rubber, EPDM (Mooney viscosity: 20), 1 part of a vulcanizing agent (dicumyl peroxide), 3 parts of a methacrylic acid ester, 1 part of zinc oxide, and 10 parts of Ketjen black and 20 parts of furnace black SAF were added, and the mixture was kneaded and mixed through a twin-roll mill for 30 minutes to prepare starting rubber.

The resulting starting rubber was weighed in a metal mold in which a core member having an outer diameter of 6 mm (a stainless steel rod, a nickel-plated iron rod, etc.) was set, press molded, and heated at 160° C. for 30 minutes to conduct first vulcanization. The vulcanized rubber was taken out of the metal mold and heated again at 160° C. for 2 hours to conduct second vulcanization. Thus, a conductive rubber layer was formed as the conductive elastomer layer around the SUS core member. The conductive rubber layer had a rubber hardness of 55° and an electrical resistance of $1.0\times 10^5\ \Omega$ (22° C., 55% RH) in the thickness direction.

Then, 100 parts of an acrylic/melamine/epoxy resin (manufactured by Dainippon Ink and Chemicals, Inc.) to which 20 parts of conductive carbon (FW-200, manufactured by Degusa) was mixed and dispersed in 100 parts of a mixed solvent of xylene, MIBK, butyl cellosolve, n-butanol and Swazol (1800) to prepare a coating for forming a surface layer having a liquid resistance of 0.13M Ω.

By use of a Bell-type electrostatic deposition machine (manufactured by Landsberg Industries), a surface layer was formed by electrostatic deposition of the above-mentioned coating for forming the surface layer on the conductive rubber layer so that the dry film thickness becomes 30 μm to prepare a roll for electrostatic charging 1 as shown in FIG. 1.

The conditions in the electrostatic deposition are as follows.

Applied voltage: 85 KV

Air pressure: 2.8 $Kg/cm^2$

Discharge amount: 70 ml/min

Gap between spray gun and coated material: 350 mm

In FIG. 1, the reference numeral 2 is the core member, the reference numeral 3 is the conductive elastomer (rubber) layer, and the reference numeral 4 is the surface layer which is electrostatically coated film by electrostatic deposition.

The resistance of the surface layer of this roll for electrostatic charging was measured in the following manner. For resistance of an inner region of the surface layer, electrodes 5 of 10 square mm were painted with silver paste on the core member 2 and the surface layer 4, and a direct voltage of 100 V was applied between both the electrodes 5 to measure the value of current. Then, the resistance was determined from the values of current and applied voltage to be $5\times 10^6\ \Omega$. The resistance of an outermost surface region of the surface layer was measured with a Hylester ohmmeter (manufactured by Mitsubishi Petrochemical Co., Ltd.) to be $9\times 10^{13}\ \Omega$.

After standing for 72 hours in an atmosphere of 32° C. ×85% RH, this roll for electrostatic charging was mounted so as to rotate in contact with a photosensitive material 6 of a laser printer (LBP-8, manufactured by Cannon Co., Ltd.), and a charging test was conducted under the circumstances of high temperature and high moisture (28° C.×85% RH) and of low temperature and low moisture (10° C.×15% RH) while applying 350 V DC voltage superposed with 350μA AC constant current to the core member 2 from a power source 7. As a result, uniform, satisfactory electrostatic charge was ascertained under either of the circumstances, and images of high quality were formed. At this time, the state of strains on the surface of the photosensitive material 6 was examined. As a result, no stain due to exuded components was observed.

Further, in order to examine the effect of preventing leaks, a similar charging test was conducted changing the applied voltage to an AC voltage of 2 kV. As a result, no leak phenomenon induced by a pinhole of the photosensitive material 6 occurred, and a stable charged potential was obtained.

EXAMPLE 2

To 100 parts of a polyester polyol (DDX-106, manufactured by Dainippon Ink and Chemicals, Inc,), 10 parts of an isocyanate (Millionate MT, manufactured by Nippon Polyurethane Co.) and 5 parts of Ketjen black (ECF, manufactured by Mitsubishi Petrochemical Co., Ltd.) were added, followed by polymerization with stirring to obtain an original polyurethane rubber fluid. The original urethane rubber fluid was poured into a mold in which a core member was provided, and cured at 100° C. for 3 hours to form a conductive urethane rubber layer. This conductive urethane rubber layer had an electrical resistance of $6.5\times10^5$ Ω (22° C., 55% RH) in the layer thickness direction.

Then, 100 parts of an acrylic urethane resin (Hiurethane No. 5001, manufactured by Nippon Oil and Fats Co., Ltd.) to which 2 parts of conductive carbon (S Carbon, manufactured by Colombia Carbon Co.) were added was mixed and dispersed in 230 parts of a mixed solvent of toluene, xylene, ethyl acetate, butyl cellosolve and n-butanol. Subsequently, 16 parts of a polyisocyanate (Hiurethane curing agent HF, manufactured by Nippon Oil and Fats Co., Ltd.) were added thereto to prepare a coating for forming a surface layer having a liquid resistance of 0.20MΩ.

The resulting coating was applied to the above-mentioned conductive urethane rubber layer by electrostatic deposition by use of the electrostatic deposition machine used in Example 1 so as to give a dry film thickness of 35 μm to provide a roll for electrostatic charge.

The resistance of the surface layer of this roll for electrostatic charging was determined in the same manner as with Example 1. As a result, the resistance of an inner region was $2\times10^5$ Ω, and the resistance of an outermost surface region was $1\times10^{14}$ Ω.

Further, using this roll for electrostatic charging, a charging test was conducted in the same manner as with Example 1. As a result, uniform, satisfactory electrostatic charge was obtained under either of the circumstances. At this time, no stain due to exuded components was observed on the surface of the photosensitive material.

Furthermore, the desired effect of preventing leaks was evaluated. As a result, observed leaks were found to have been effectively prevented.

COMPARATIVE EXAMPLE 1

A roll for electrostatic charge was produced in the same manner as in Example 1 with the exception that a coating for forming a surface layer having the same composition as that used in Example 1 was applied by spray coating.

The resistance of the surface layer of the resulting roll for electrostatic charging was determined in the same manner as in Example 1. As a result, no difference in resistance between an inner region and an outermost surface region was observed, and each was $1\times10^{10}$ Ω.

For this roll for electrostatic charging, a charging test was conducted in the same manner as with Example 1. As a result, poor electrostatic charge was generated here and there, and a fogging phenomenon of low-density image regions or a ghost phenomenon was observed in the resulting images.

Further, the effect of preventing leak was similarly examined. As a result, the dielectric breakdown took place in the surface layer.

As described above, in the roll for electrostatic charging of the present invention, the surface layer having a higher electrical resistance in an outermost surface region thereof is provided on the conductive elastomer layer. The roll is not therefore affected by working environmental conditions, and can conduct uniform, stable electrostatic charge.

Further, such a surface layer can be simply formed on the conductive elastomer layer to a constant thickness with high adhesion by electrostatic deposition, and the high resistance skin layer having no uneven resistance is formed on the outer side thereof. Even if a high voltage is applied, therefore, a stable electrostatic charge can be conducted without generating a of leak.

Furthermore, as the conductive elastomer layer, diene-based rubber to which a softening agent, a plasticizer and a sulfur-based vulcanizing agent are not added (EPDM), or urethane rubber, is used, whereby the exuding phenomena can be more surely solved. Accordingly, the roll can be used over a long period of time without staining the photosensitive material, and the long-term storage thereof also becomes possible.

In addition, this roll for electrostatic charging has the simple two-layer structure and the surface layer thereof is easily formed by a single static deposition step, so that it can be manufactured in a short period of time at low cost.

While the invention has been described in detail and with reference to specific examples thereof, it will be apparent to one skilled in the art that various changes and modifications can be made therein without departing from the spirit and scope thereof.

What is claimed is:

1. A roll for electrostatic charging, comprising a core member having laminated thereon, in sequence, a conductive elastomer layer and a surface layer, said surface layer being a single layer that includes a binder resin and a conductive material, said surface layer having an inner surface layer region and an outermost surface layer region, said outermost surface layer region having an electrical resistance of $10^{13}$ to $10^{16}$ Ω/cm$^2$, said electrical resistance of said outermost surface layer region being higher than an electrical resistance of said inner surface layer region.

2. The roll for electrostatic charging as claimed in claim 1, wherein said conductive elastomer layer comprises at least one of ethylene-propylene-diene terpolymer (EPDM) rubber or urethane rubber, to which none of a softening agent, a plasticizer and a sulfur-based vulcanizing agent is added.

3. The roll for electrostatic charge as claimed in claim 1, wherein said binder resin is a thermosetting binder resin.

4. The roll for electrostatic charge as claimed in claim 1, wherein said surface layer is an electrostatically coated film formed by electrostatic deposition.

* * * * *